(12) United States Patent
Ohtsuka

(10) Patent No.: US 6,701,633 B2
(45) Date of Patent: Mar. 9, 2004

(54) APPARATUS AND METHOD FOR MEASURING A SHAPE USING MULTIPLE PROBES

(75) Inventor: Masaru Ohtsuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/086,399

(22) Filed: Feb. 28, 2002

(65) Prior Publication Data

US 2002/0148130 A1 Oct. 17, 2002

(30) Foreign Application Priority Data

Mar. 2, 2001 (JP) .................................. 2001-058739

(51) Int. Cl.[7] .............................................. G01B 5/207
(52) U.S. Cl. .............................. 33/552; 33/549; 33/555; 33/503; 33/557; 33/DIG. 2
(58) Field of Search ......................... 33/549, 551–555, 33/503, 504, 556–561, 546, 547, DIG. 2, 832, 833; 356/376, 349, 360, 371

(56) References Cited

U.S. PATENT DOCUMENTS

| | | | | |
|---|---|---|---|---|
| 4,611,408 A | * | 9/1986 | Plante | .......................... 33/552 |
| 4,724,525 A | * | 2/1988 | Purcell et al. | ............... 356/500 |
| 4,785,545 A | * | 11/1988 | Aubele | .......................... 33/557 |
| 4,908,951 A | * | 3/1990 | Gurny | .......................... 33/503 |
| RE33,774 E | * | 12/1991 | Gurny | .......................... 33/503 |
| 5,333,386 A | * | 8/1994 | Breyer et al. | ................. 33/1 M |
| 5,822,877 A | * | 10/1998 | Dai | .............................. 33/560 |
| 5,901,455 A | * | 5/1999 | Leitenberger et al. | ........ 33/503 |

* cited by examiner

*Primary Examiner*—Diego Gutierrez
*Assistant Examiner*—Yaritza Guadalupe
(74) *Attorney, Agent, or Firm*—Morgan & Finnegan, LLP

(57) ABSTRACT

There is provided a shape measuring apparatus which defines an XYZ-axis coordinate and measures a surface shape of an object, the apparatus including a plurality of probes arranged in a Y-axis direction, the probes contacting a surface of the object, and moving in a Z-axis direction according to the surface shape of the object, a probe holder for holding each of the plurality of probes movable in the Z-axis direction, a moving mechanism for moving the probe holding mechanism in an X-axis direction relative to the object, first and second measuring instruments for measuring positions of each probe in the X-axis and Y-axis directions, a third measuring instrument for measuring a position of each probe in the Z-axis direction; and a computing unit for calculating the surface shape of the object based on measuring results from the first, second, and third measuring instruments.

27 Claims, 9 Drawing Sheets

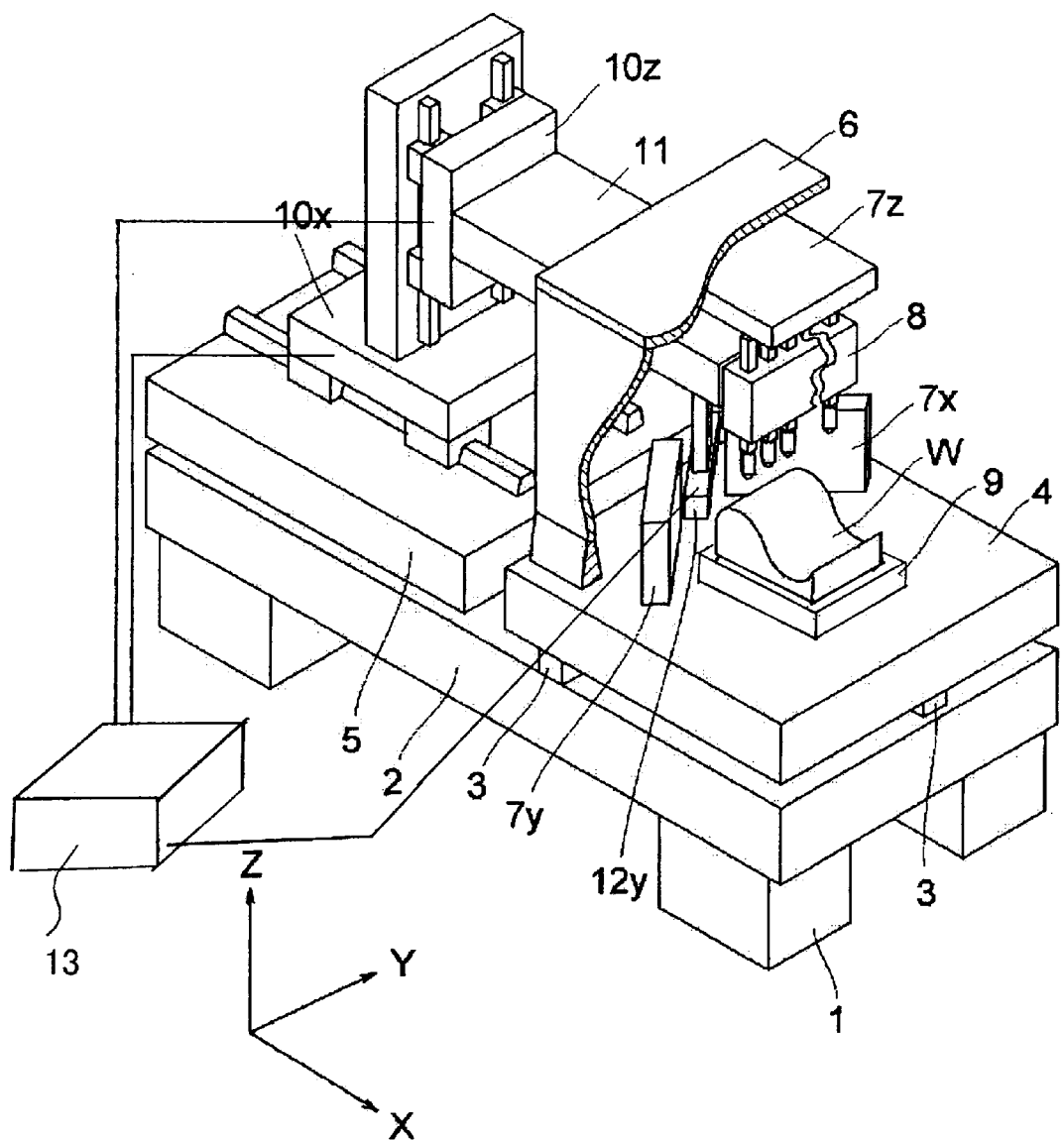
F I G. 1

APPARATUS AND METHOD FOR MEASURING A SHAPE USING MULTIPLE PROBES

BACKGROUND OF THE INVENTION

1. Field of the Invention

The present invention relates to apparatuses for measuring smooth and continuous shapes of a mold, a mirror, a lens, etc. of a relatively large aperture for use with a camera, a video, and a semiconductor manufacturing apparatus, etc., and more particularly to a shape measuring apparatus using multiple probes to measure aspheric shapes, spherical and plane three-dimensional shapes of a large aperture, which are hard to be measured by a normal interferometer.

2. Description of the Related Art

Conventional three-dimensional shape measuring apparatuses have typically scanned, in X-Y or r-θ directions, a single probe which is able to measure a position in a Z direction, so as to measure a entire shape of an object to be measured.

Japanese Laid-Open Patent Publication No. 3-255907 discloses, as a typical example, a measuring apparatus which includes a single probe unit, mounted on a mechanism for scanning an object in X and Y directions, and obtains data relating to a surface shape of the object by measuring probe's X, Y and Z positions when the probe traces the surface of the object.

However, the three-dimensional shape measuring apparatus in Japanese Laid-Open Patent Publication No. 3-255907 uses the single probe to scan the surface of the object, disadvantageously requiring time to measure the entire surface of the object.

An arrangement of a plurality of probes is one conceivable a solution for this problem. Japanese Laid-Open Patent Publication No. 6-317412 discloses a plurality of probes arranged in a row on a vertically and horizontally movable frame so as to scan a relief shape of an object by moving the movable frame.

Recent lenses, mirrors, molds, etc. have increasingly required a smooth and continuous surface shape with an extremely strict surface precision such as 0.1 µm or below. Therefore, an acquisition of precise three-dimensional shape data requires an accurate recognition of a position in a Z-axis direction as well as positions in X-axis and Y-axis directions.

BRIEF SUMMARY OF THE INVENTION

Accordingly, it is an exemplary object of the present invention to provide an apparatus and method for measuring a shape using a multiple probes, which may provide precise three-dimensional data of an object to be measured, and eliminate the above disadvantages.

In order to achieve the above object, a shape measuring apparatus of one aspect of the present invention, which defines an XYZ-axis coordinate and measures a surface shape of an object includes a plurality of probes arranged in a Y-axis direction, the probes contacting a surface of the object, and moving in a Z-axis direction according to the surface shape of the object, a probe holder for holding each of the plurality of probes movable in the Z-axis direction, a moving mechanism for moving the probe holding mechanism in an X-axis direction relative to the object, first and second measuring instruments for measuring positions of each probe in the X-axis and Y-axis directions, a third measuring instrument for measuring a position of each probe in the Z-axis direction, and a computing unit for calculating the surface shape of the object based on measuring results from the first, second, and third measuring instruments. In an alternative aspect of the present invention, the first and second measuring instruments measure moving amounts of each probe in the X-axis and Y-axis directions.

The first and second measuring instruments may additionally measure inclinations of each probe in rotating directions around the X-axis and Y-axis, so as to correct the surface shape of the object calculated by the computing unit. The first and second measuring instruments may measure the inclinations of each probe in the rotating directions around the X-axis and Y-axis by measuring a plurality of points of the probes in the Z-axis direction. A plurality of first and second measuring instruments may be respectively arranged in the Z-axis direction, and simultaneously measure the plurality of points in the Z-axis direction.

The probe holder may hold the probes using a non-contact air guide that allows the probes to be movable only in the Z-axis direction, and each probe may be connected to a cylinder mechanism for adjusting a contact force between the probe and the object by balancing probe's own weight.

The moving mechanism may move the probe holder in the X-axis direction while allowing the probes to contact the surface of the object.

The moving mechanism may move the probe holder in the X-axis direction while the probe is being separated from the surface of the object after measurements by the first, second and third measuring instruments.

The shape measuring apparatus may further include a second moving mechanism for moving the probe holder in the Y-axis direction relative to the object.

The probe may include a first position-measuring plane mirror arranged and rotated by a first angle from the X-axis around the Z-axis, and a second position-measuring plane mirror arranged and rotated by a second angle from the Y-axis around the Z-axis, wherein the first measuring instrument may include a first reference plane mirror arranged and rotated by the first angle from the X-axis around the Z-axis, and measure a separation between the first position-measuring plane mirror and the first reference plane mirror, and wherein the second measuring instrument may include a second reference plane mirror arranged and rotated by the second angle from the X-axis around the Z-axis, and measure a separation between the second position-measuring plane mirror and the second reference plane mirror. The first and second angles may be about 45°.

Each probe may include a third position-measuring plane mirror for measuring a position of the probe in the Z-axis, wherein the third measuring instrument may include a third reference plane mirror having a normal in the Z-axis direction, and measure a separation between the third position-measuring plane mirror and the third reference plane mirror. The probe may include a position-measuring mirror block provided with the first and second position-measuring plane mirrors, a contact ball that is attached to a tip of the position-measuring mirror block, and contacts the object, and a probe shaft provided at a rear end of the position-measuring mirror block, the third reference plane mirror being formed at a rear end surface of the position-measuring mirror block. The probe shaft has a hollow part, through which the third measuring instrument measures the separation between the third position-measuring plane mirror and the third reference plane mirror.

A shape measuring method of another aspect of the present invention for measuring a surface shape of an object on an XYZ-axis coordinate includes the steps of moving, in a Z-axis direction, a plurality of probes arranged in a Y-axis direction, while bringing each probe into contact with the object, measuring contact position between each probe and the object in X-axis and Y-axis directions using first and second measuring instruments, measuring a contact position of each probe in the Z-axis direction using a third measuring instrument, moving the plurality of probes in the X-axis direction relative to the object, repetitively measuring contact positions of each probe in the X-axis, Y-axis, and Z-axis directions using the first, second and third measuring instruments, and calculating the surface shape of the object based on contact positions in the X-axis, Y-axis, and Z-axis directions measured by the first, second and third measuring instruments.

A shape measuring method of still another aspect of the present invention for measuring a surface shape of an object on an XYZ-axis coordinate includes the steps of moving, in a Z-axis direction, a plurality of probes arranged in a Y-axis direction, while bringing each probe into contact with the object, measuring contact positions between each probe and the object in X-axis and Y-axis directions using first and second measuring instruments, measuring the contact position in the Z-axis direction using a third measuring instrument, measuring one sectional shape of the object in the Y-axis direction from the contact positions of the plurality of probes measured by the first, second and third measuring instruments, moving the plurality of probes in the X-axis direction relative to the object, repetitively measuring a plurality of sectional shapes in the Y-axis directions using the first, second and third measuring instruments, and calculating the surface shape of the object using the plurality of sectional shapes in the Y-axis direction measured by the first, second and third measuring instruments.

The above and other objects of the present invention will become more apparent from the following drawings taken in conjunction with the accompanying drawings.

BRIEF DESCRIPTION OF THE DRAWINGS

FIG. 1 is a perspective view of a shape measuring apparatus of a first embodiment according to the present invention.

DETAILED DESCRIPTION OF THE PREFERRED EMBODIMENTS

Figure 2:
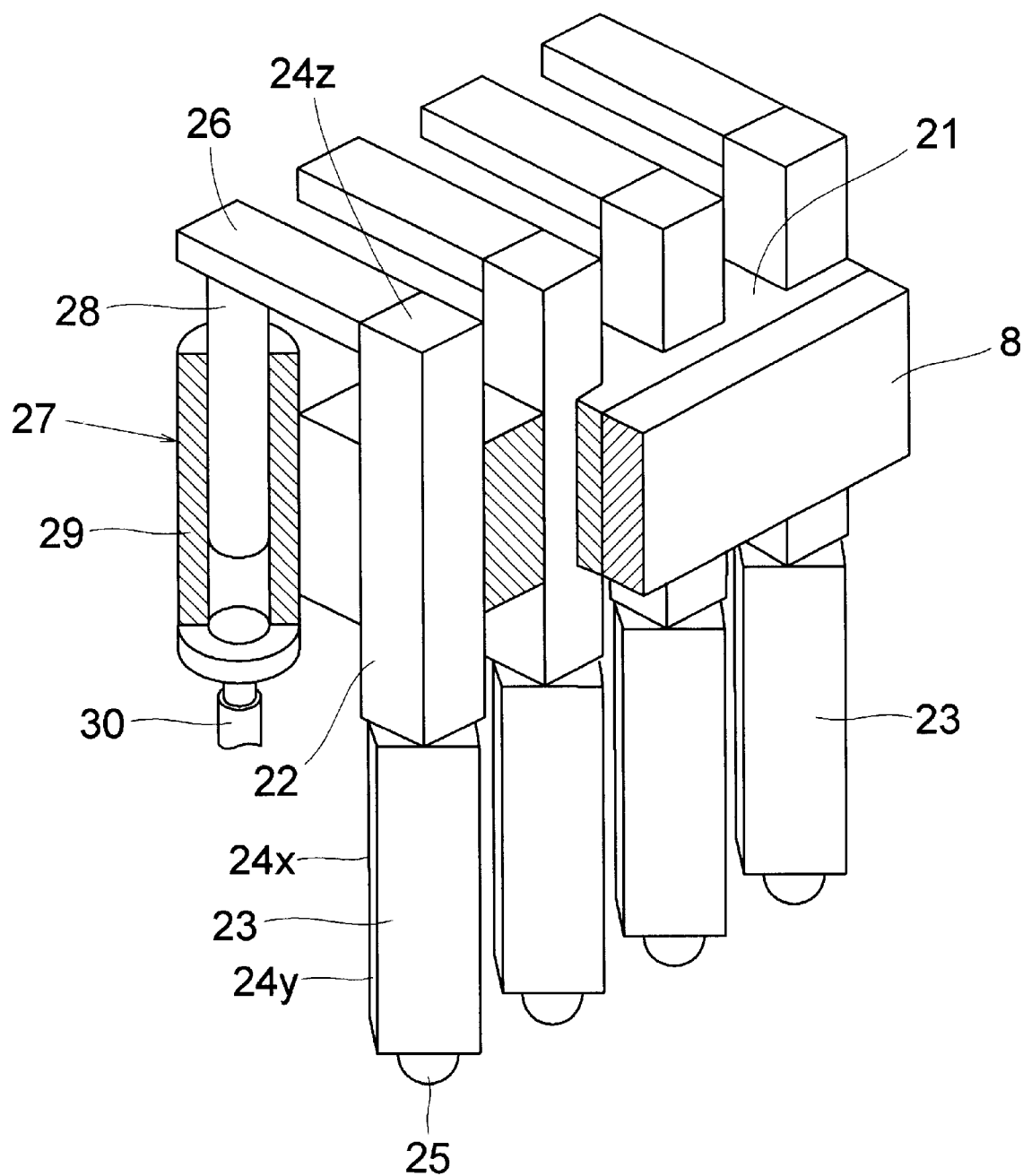
FIG. 2 is a perspective view of a multi-probe part in the shape measuring apparatus of the first embodiment.

A description will now be given of illustrated embodiments of the present invention.

FIG. 1 shows a first embodiment of the present invention. In order to prevent transmissions of floor vibrations, an apparatus base 2 is mounted on a vibration-proof apparatus 1. A measurement base 4 that supports a probe scan unit, and a stage base 5 that supports a measurement reference unit are mounted on the apparatus base 2 through a three-point mounting block 3 that prevents propagations of deformation forces. A measurement frame 6 is formed on the measurement base 4. An X reference plane mirror 7x and a Y reference plane mirror 7y are provided in the measurement frame 6 on the measurement base 4. The X reference plane mirror 7x is arranged while rotated by 45° from an X-axis around a Z-axis, while the Y reference plane mirror 7y is rotated by 45° from a Y-axis around the Z-axis. A Z reference plane mirror 7z is provided and hung down from a top surface of the measurement frame 6 over these X and Y reference plane mirrors 7x and 7y.

A multi-probe head 8 is supported in the measurement frame 6 so as to be movable in the X-axis direction by means, which will be described. The multi-probe head 8 holds a multiplicity of probes that are arranged in the Y-direction and allowed to be move in the Z-axis direction. These probes are arranged in the Y-axis direction. An object to be measured W held by an anvil 9 is placed on the measurement base 4 and enclosed by the X, Y and Z reference plane mirrors 7x, 7y, and 7z.

On the other hand, provided on the stage base 5 are an X stage 10x for moving the multi-probe head 8 in the X-axis direction, a Z stage 10z for moving the multi-probe head 8 in the Z-axis direction, and a probe arm 11 for fixing the multi-probe head 8 onto the Z stage 10z. Three X, Y, and Z measuring heads 12x (not shown), 12y and 12z (not shown) are provided at a tip of the probe arm 11 so as to detect positions in the X, Y and Z directions.

13 denotes a computer including control means for controlling operations of X stage 10x and Z stage 10z, and computing means for computing a surface shape of the object W based on measurement values by the X, Y, and Z measuring heads 12x, 12y and 12z.

FIG. 2 is a structural view of the multi-probe head 8. Attached to the multi-probe head 8 through an air bearing 21 are a plurality of probe shafts 22 that are arranged in the Y-axis direction and each movable in the Z-axis direction. An XY-directional position measuring mirror block 23 is precisely attached to a lower part of each probe shaft 22 in a direction rotated by 45° around the Z-axis direction. X and Y measuring reflective surfaces 24x and 24y are provided on each mirror block 23 while facing toward the reference plane mirrors 7x, 7y, and a contact ball 25 is fixed at a tip of the mirror block 23. The contact ball 25 is manufactured with high precision, and loaded onto the mirror block 23 by such means as bonding, vacuum absorption, magnetic absorption, etc. A Z measurement reflective surface 24z is attached to a top of each probe shaft 22.

A miniature cylinder 27 is connected through a connector member 26 to an upper part of each probe shaft 22 to cancel probe's own weight and provide a small contact pressure, whereby a piston 28 may vertically move without contacting a cylinder 29. The cylinder 29 is provided with a compressed-air supply port 30.

In order for the miniature cylinder 27 to keep the desired contact pressure, the supply pressure is adjusted so that a force calculated by (piston sectional area)×(supply gauge pressure) may be slightly weaker than the total weight applied to the probe shaft 22 and piston 28 during the measurement period, while the supply pressure is switched so that a force calculated by (piston sectional area)×(supply gauge pressure) may be stronger than the total weight applied to the probe shaft 22 and piston 28. Thereby, the entire probe shaft 22 may be lifted up to the uppermost end.

The X measuring head 12x is located between the X reference plane mirror 7x and the mirror block 23, and measures a distance between the X reference plane mirror 7x and X measuring reflective surface 24x. The Y measuring head 12y is located between the Y reference plane mirror 7y and the mirror block 23, and measures a distance between the Y reference plane mirror 7y and Y measuring reflective surface 24y. The Z measuring head 12z is located between the Z reference plane mirror 7z and the probe shaft 22, and measures a distance between the Z reference plane mirror 7z and Z measuring reflective surface 24z at a top end of the probe shaft 22. The measuring means may use general laser light interference.

Among these three X, Y, and Z reference plane mirrors 7x, 7y, and 7z, the Z reference plane mirror 7z is attached to the measurement frame 6 so that the Z-axis may be parallel to the normal, whereas the X, Y reference plane mirrors 7x and 7y are attached so as to be inclined by about 45° from the X-axis and Y-axis. This is because the multi-probe head 8 arranges its probes in the Y-axis direction, and thus the mirror arrangement that accords with the X-axis and Y-axis would make it impossible to measure a deformation of each probe in the Y-axis direction.

It is preferable to attach to the X-axis and Y-axis at an inclined angle of 45° the X and Y reference plane mirrors 7x and 7y and the opposite Y and Y measurement reflective surfaces 24x and 24y, although 45° is unnecessary when they are arranged in a range detectable by the X and Y measuring heads 12x and 12y. 45° is the most preferable because it makes the operation simplest, as will be described later, and thereby ensures measurements by the X and Y measuring heads 12x and 12y.

Since it is necessary to consider that the X, Y and Z reference plane mirrors 7x, 7y, and 7z, and the object W do not change their positional relationships and surface shapes in the instant configuration, the measurement base 4, measurement frame 6, X, Y and Z reference plane mirrors 7x, 7y, and 7z, etc. are made, for example, of low thermal-expansion die or glass ceramics. In addition, the measurement base 4, measurement frame 6, etc., are designed to have sufficient rigid materials and structures so as to prevent mechanical vibrations and deformations.

Figure 3:
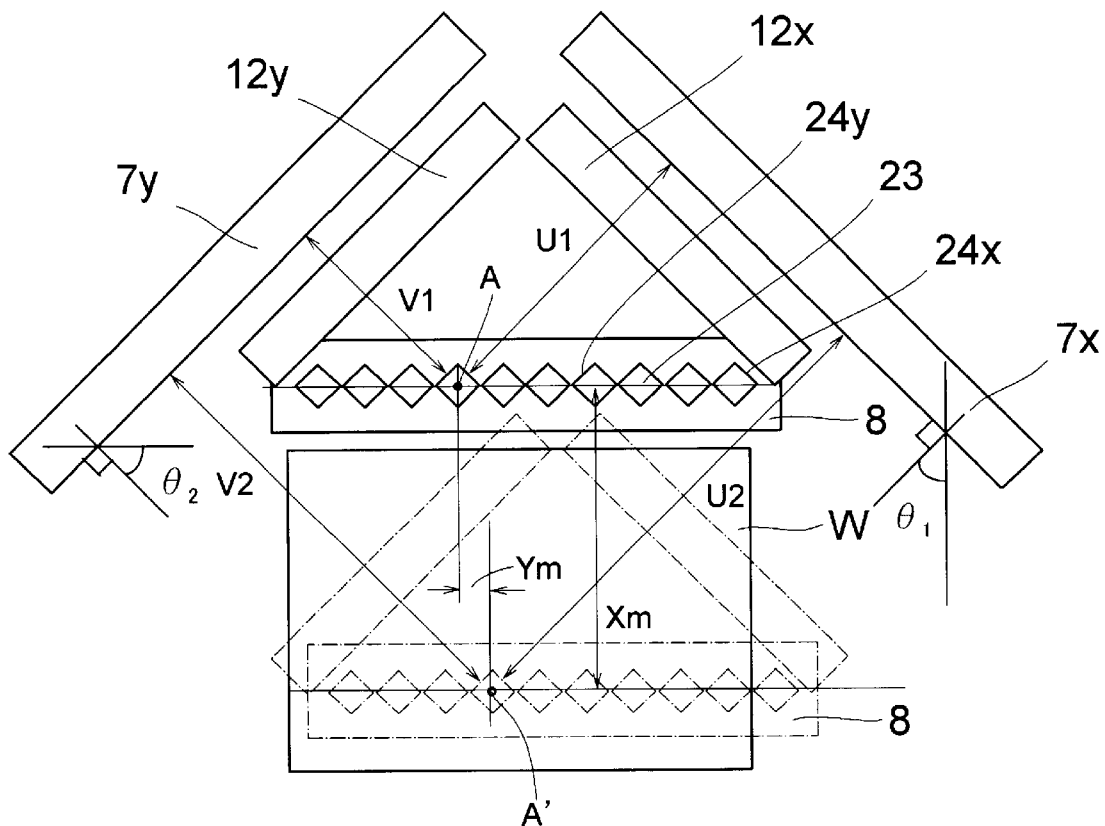
FIG. 3 is a view for explaining measuring methods in X-axis and Y-axis directions of the first embodiment.
Figure 4:
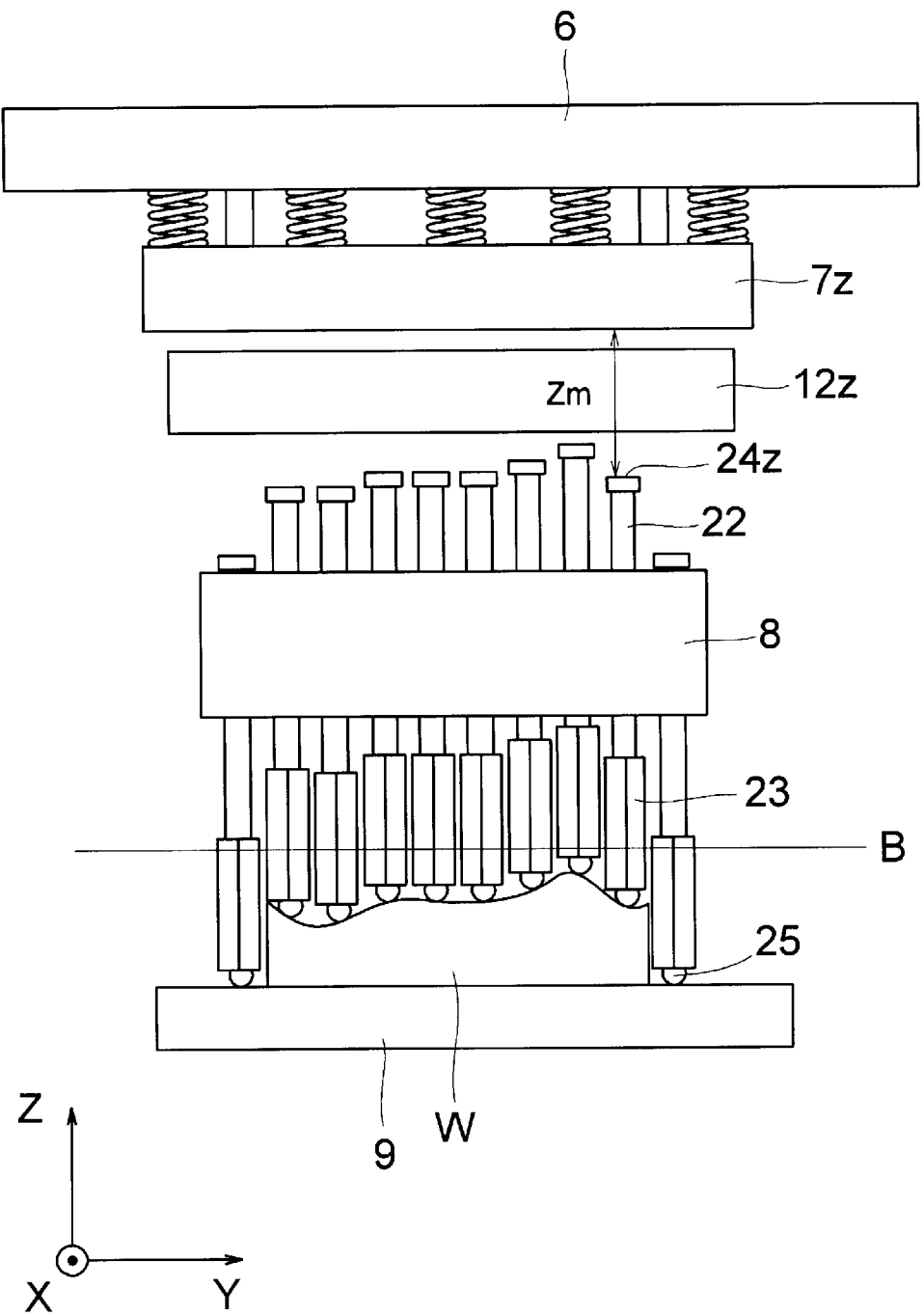
FIG. 4 is a view for explaining a measuring apparatus in a Z-axis direction of the first embodiment.

FIGS. 3, 4 and 5 are views for explaining measurement operations: FIG. 3 is a front view of the inside of the measurement frame 6 viewed from the Z-axis, showing the X and Y reference plane mirrors 7x and 7y, object W, multi-probe head 8, and X and Y measuring heads 12x and 12y. One probe shaft 22 depicted by "A" in the multi-probe head 8 is now addressed. It is assumed that a distance $V_1$ between the Y reference plane mirror 7y and A and a distance $U_1$ between the Y reference plane mirror 7y and A are obtained as initial reference measurement values. Then, where the probe head 8 is moved to a dotted-line position by moving the X stage 10x, it is assumed that a distance $V_2$ between the Y reference plane mirror 7y and post-movement A' and a distance $U_2$ between the Y reference plane mirror 7y and post-movement A' are obtained as measurement values at that position of the probe head 8. The X reference plane mirror 7x and opposite X measuring reflective mirror surface 24x are attached to the X-axis at an inclination angle of $\theta_1$ while the Y reference plane mirror 7y and opposite Y measuring reflective mirror surface 24y are attached to the Y-axis at an inclination angle of $\theta_2$.

In this case, moving distances Xm and Ym of the probe head 8 in the X and Y directions relative to the position A are defined as follows:

$$X_m = \frac{(U_2 - U_1) \cdot \cos\theta_1 + (V_2 - V_1) \cdot \sin\theta_2}{\cos(\theta_1 - \theta_2)}$$

$$Y_m = \frac{(V_2 - V_1) \cdot \cos\theta_2 - (U_2 - U_1) \cdot \sin\theta_1}{\cos(\theta_1 - \theta_2)}$$

The operation becomes very simple where $\theta_1 = \theta_2 = 45°$ as follows:

$X_m = (U_2 - U_1) \cdot \cos\theta_2 + (V_2 - V_1) \cdot \sin\theta_1$ $Y_m = (V_2 - V_1) \cdot \cos\theta_1 - (U_2 - U_1) \cdot \sin\theta_2$ Then, Xm and Ym become as follows:

$$X_m = \frac{1}{\sqrt{2}} \cdot \{(U_2 - U_1) + (V_2 - V_1)\}$$

$$Y_m = \frac{1}{\sqrt{2}} \cdot \{(V_2 - V_1) - (U_2 - U_1)\}$$

Such a measurement and calculation are executed for all the probe shafts 22, and the moving amounts Xm and Ym are measured for each probe scan, whereby the relative positions of the contact ball 25 in the X-axis and Y-axis directions relative to the object may be calculated.

Figure 5A:
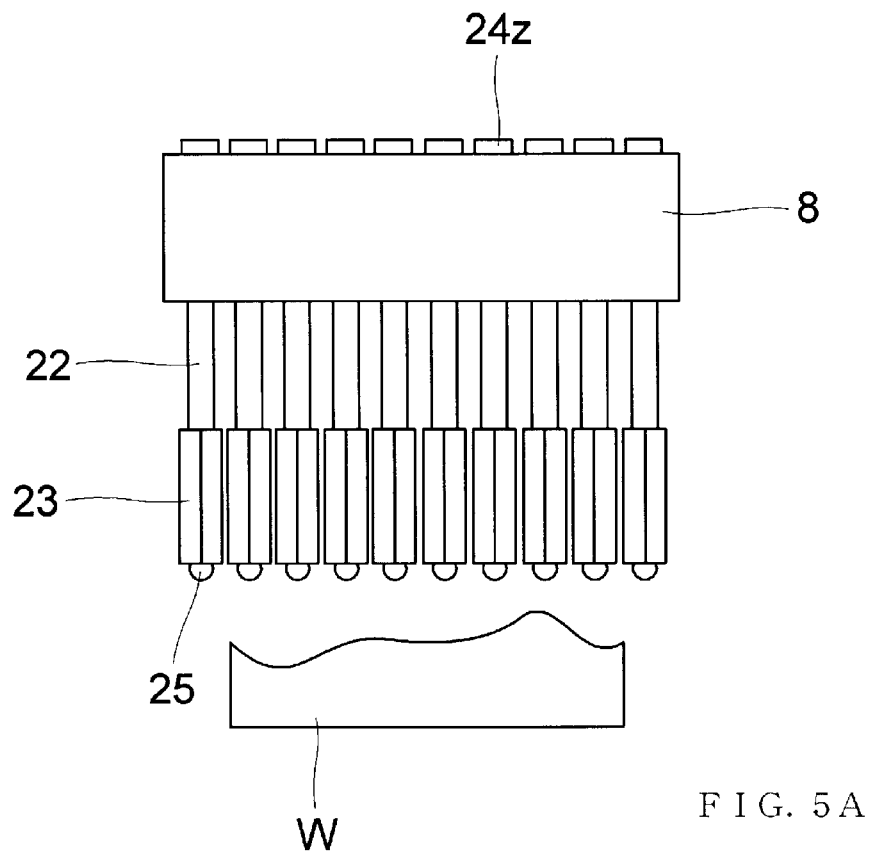
FIG. 5 is a view for explaining a measuring method in a Z-axis direction of the first embodiment.
Figure 5B:
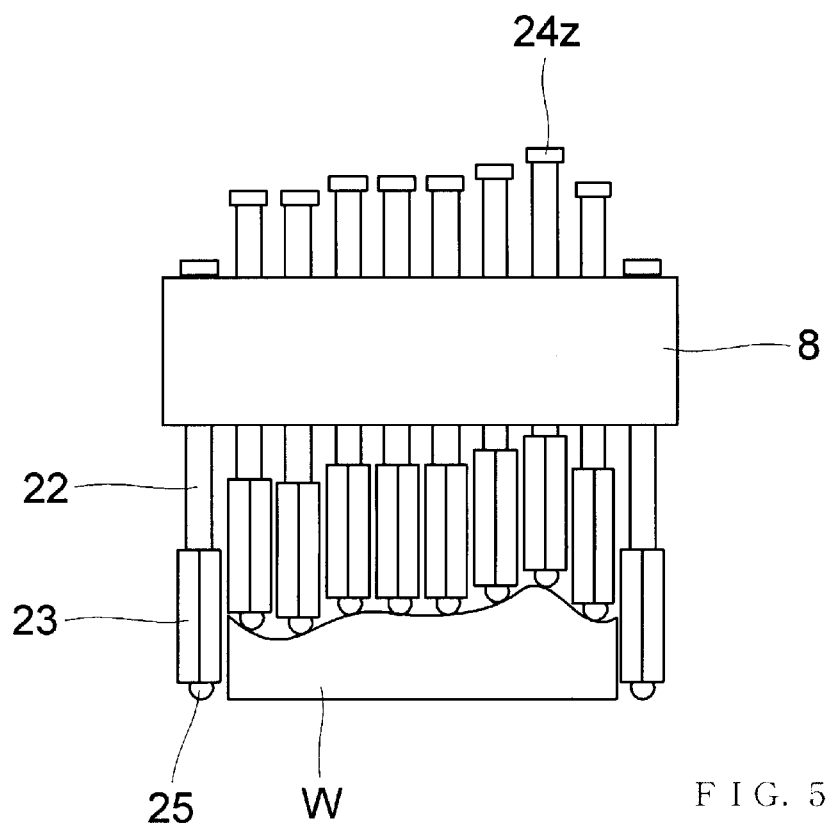

FIG. 4 is a plane view of the measurement unit viewed from the X-axis, showing the anvil 9, object W, multi-probe head 8, mirror block 23, Z measurement reflective surface 24z, Z measuring head 12z, Z reference plane mirror 7z, measurement frame 6, etc. In an attempt to bring the contact ball 25 into contact with the object W, the multi-probe head 8 is lifted up in the Z-axis direction as shown in FIG. 5A and then the contact ball 25 is descended down to the object W as shown in FIG. 5B, thereby preventing damages of the object W when the probe head 8 is descending. At the same time, the miniature cylinder 27 balances the weight of each probe shaft 22, allowing the probe shaft 22 to be brought into contact with the object W with the small contact pressure.

A position of the contact ball 25 in the Z-axis direction may be obtained by using the Z measuring head 12z to measure a moving distance Zm of each probe shaft 22 from the Z reference plane mirror 7z to a top end of each probe shaft 22 when all the probe shafts 22 existing over the object W are brought into contact with the object W, whereby one sectional shape of the object W in the Y-axis direction is completed at the same time. A line B shown in FIG. 4 indicates a height of light by which the X and Y measuring heads 12x and 12y measure positions of the mirror block 23 in the X and Y directions.

Figure 6:
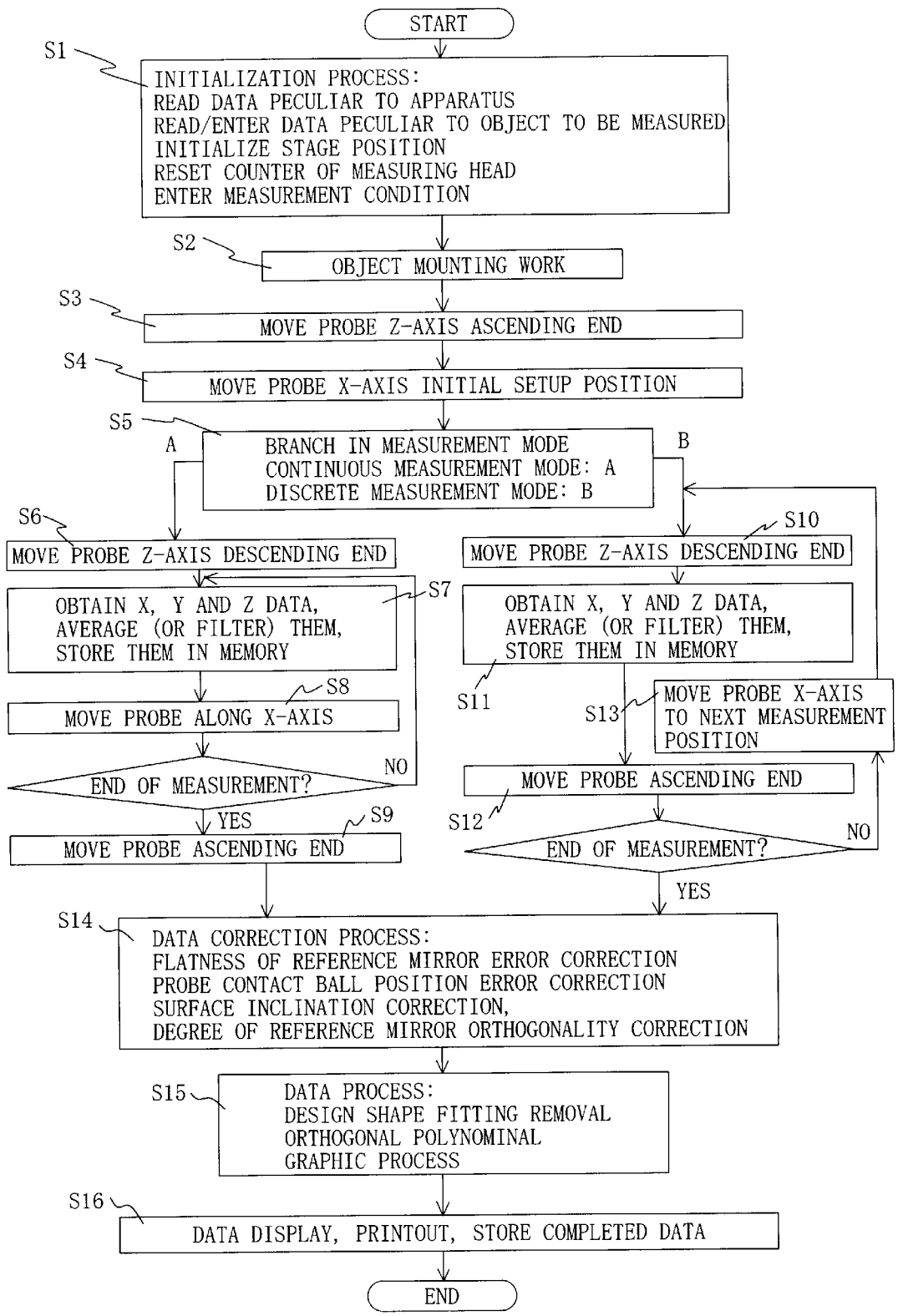
FIG. 6 is a measurement flowchart of the first embodiment.

FIG. 6 is a measurement flowchart of the instant embodiment. The flow begins with an initialization operation including reading of data peculiar to the apparatus, reading/entry of data peculiar to the object, an initialization of a stage position, resetting of measuring head's counter, and entry of measurement conditions, etc. (step S1).

The object W is placed on the measurement base 4 (step S2), and a measurement start command is output. In response to the measurement start command, the probe shaft 22 is ascended up to a safety position where it does not contact the object W (step S3) (see FIG. 5A), and then the X stage 10x is moved to a first section-measuring position (step S4) (see FIG. 5B).

A method for measuring a surface includes a continuous measurement mode (A) and a discrete measurement mode (B): The continuous measurement mode (A) brings the probe shafts 22 into contact one line of the object W as shown in FIG. 5B, and then uses the X stage 10x to scans in the X-axis direction while keeping the contacts between the probe shafts 22 and the object W. On the contrary, the discrete measurement mode (B) brings the probe shafts 22 into contact with one line of the object W as shown in FIG. 5B, then once releases the contacts between them as shown in FIG. 5A, then moves the probe shaft 22 in the X-axis direction, and brings the probe shafts 22 into contact with the object W again.

The continuous measurement mode (A) is suitable for data correction at a small pitch in the X-axis direction and advantageous in short measurement time, although it is likely to damage the object W and pick up dust on the object W. On the other hand, the discrete measurement mode (B) is unlikely to damage the object W, but requires time to collect data from many points. A user may select one of the modes (A) and (B) considering a requirement of measurement data (step S5).

In case of the continuous measurement mode (A), the probe shafts 22 are descended and brought into contact with the surface of the object W (step S6), and then X, Y and Z data are obtained from all the probe shafts 22. If necessary, the data collection is repeated, filtered (e.g., averaged), and then stored as one line data in a memory (step S7). Simultaneously, one sectional shape in the Y-axis direction may be computed.

The probe shafts 22 are moved in the X direction while keeping their contacts (step S8), and then X, Y and Z data are obtained from all the probe shafts 22. If necessary, the data collection is repeated, filtered (e.g., averaged), and then stored as one line data in a memory until the X stage 10x finishes scanning a previously determined measurement range. After the scan ends, the probe shafts 22 are moved to the top end (step S9).

In case of the discrete measurement mode (B), the probe shafts 22 are descended, brought into contact with a surface of the object W (step S10), and then X, Y and Z data are obtained for all the probe shafts 22. If necessary, the data collection is repeated, filtered (e.g., averaged), and then stored as one line data in a memory (step S11). Simultaneously, one sectional shape in the Y-axis direction may be computed. The probe shafts 22 are then ascended once (step S12) to release their contacts with the object W, and then the X stage 10x is moved to a next target position (step S13).

Again, the probe shaft 22 is descended and brought into contact with the surface of the object W, and then X, Y and Z data are obtained for all the probe shafts 22. If necessary, the data collection is repeated, filtered (e.g., averaged), and then stored as one line data in a memory. The probe shafts 22 are then moved to the top ends and then moved to next measurement positions in the direction X to repeat the scan until the X stage 10x finishes scanning a previously determined measurement range.

A measurement data process follows the data collected under either mode: First, as a measurement data correction process, previously obtained shape correction values of X and Y reference plane mirrors 7x and 7y are properly corrected according to the X and Y positions. Then, a center position of the contact ball 25 attached to the tip of each probe shaft 22 is corrected in view of the X and Y measurement reflective surfaces 24x and 24y of each probe shaft 22. Contact positions are also corrected according to an inclined angle on the surface of the object W. A degree of orthogonality is also corrected relative to the X, Y and Z reference plane mirrors 7x, 7y and 7z (step S14).

Completely corrected data is subject to a next data process, which includes a space data fitting with six degrees of freedom for calculating an error from the designed shape, thereby calculating a shape error irrespective of a loading position and orientation of the object W. If necessary, other processes may further follow, such as an orthogonal polynomial fitting for calculating a characterizing amount of the shape error including the Zernike polynomial, a fitting to approximation function, etc., and a process for graphic display purposes (step S15).

One measurement ends when these process results are displayed on a monitor screen, output through a printer, stored in a storage device and made freely available by another computer through a network (step S16).

Figure 7:
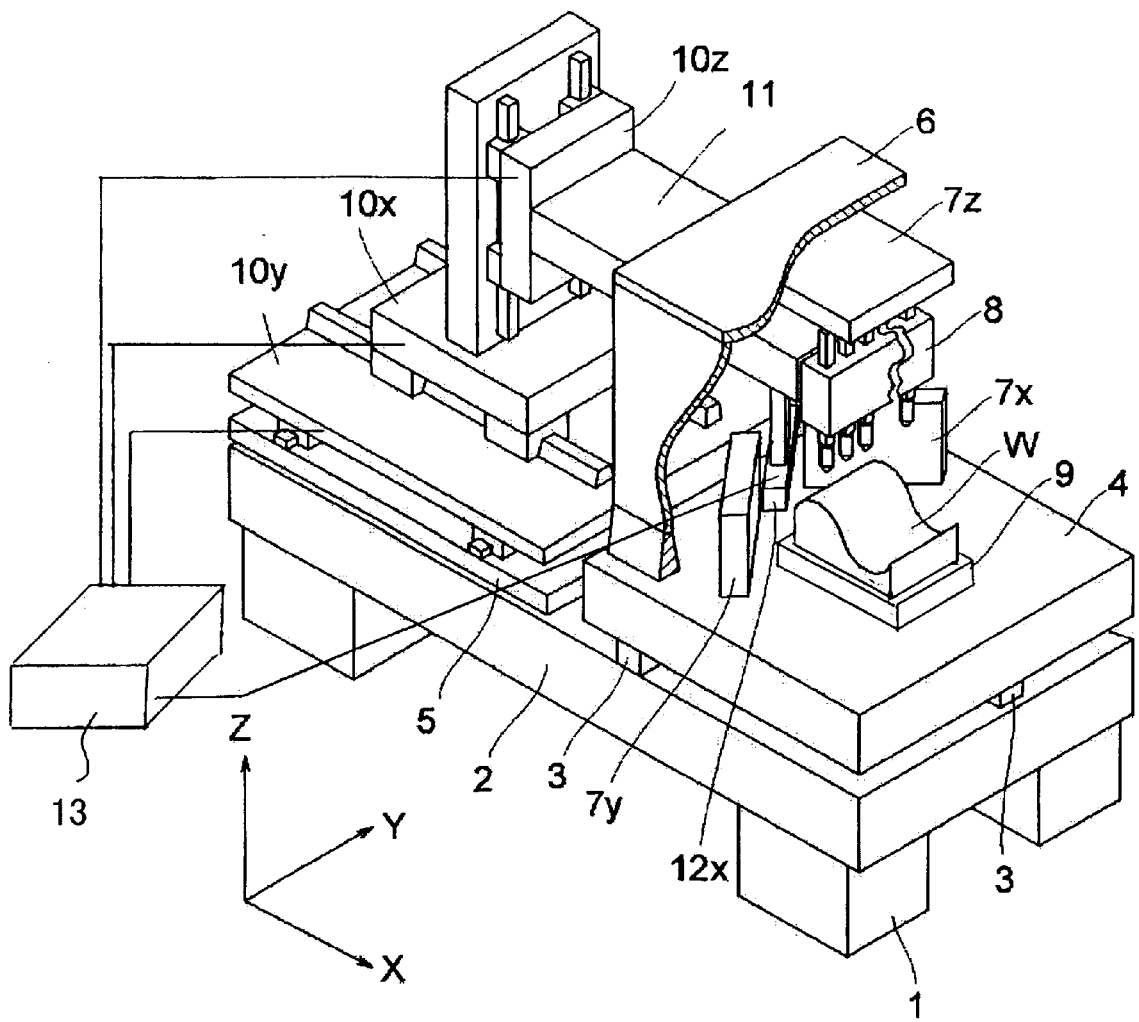
FIG. 7 is a perspective view of a shape measuring apparatus of a second embodiment according to the present invention.

FIG. 7 shows a second embodiment of the present invention, which has the same structure as the first embodiment except that the Y stage 10y that moves the probe shafts 22 in the Y-axis direction is added to the measurement reference unit.

A separation between the probe shafts 22 determines a measurement pitch in the Y-axis direction in the first embodiment, whereas the Y stage 10y in the instant embodiment would realize measurement with an arbitrary fine pitch in the Y-axis direction and expands the measurement range in the Y-axis direction when the measurements are repeated as the Y stage 10y moves in the Y-axis direction as stated in the first embodiment. The movements of the Y stage 10y in the Y-axis direction might increase positional errors in the probe shafts 22 in the Y-shaft direction, but the instant embodiment may precisely measure the positional errors in the Y-axis direction.

Figure 8:
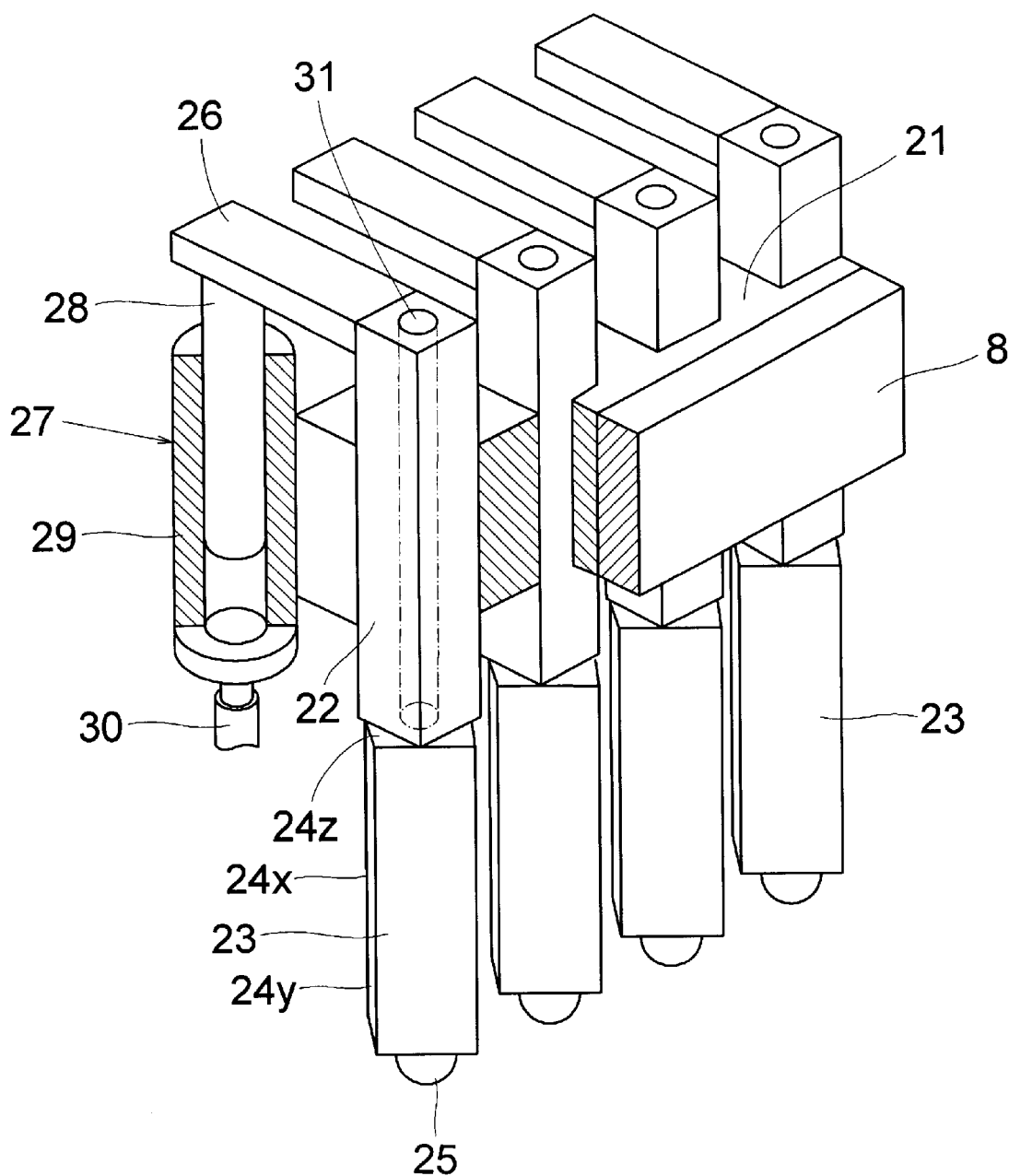
FIG. 8 is a perspective view of a multi-probe part of a third embodiment.

FIG. 8 shows the third embodiment of the present invention. This embodiment provides the Z measurement reflective surface 24z not onto an end face of each probe shaft 22 as in the first embodiment, but to an upper end face of the XY-directional position measuring mirror block 23, which is closer to the contact ball 25. The probe shaft 22 has a hollow structure having an optically transmissive hole 31 so that a laser beam may pass between the measuring head 12z and Z measurement reflective surface 24z.

The measurement of such a point closer to the contact ball 25 has an effect of reducing errors caused by the thermal expansion of the probe shafts 22. Moreover, a guarantee, in the level of part, of the degree of orthogonality of the X, Y and Z measurement reflective surfaces 24x, 24y and 24z has an effect of easy adjustments of the X, Y and Z measurement reflective surfaces 24x, 24y and 24z.

The probe shaft 22 may be made, instead of being hollowed, of a transparent material having a refractive index n, but this case would cause a measurement error of $(n-1) \times Ez$ where Ez is a thermal-expansion deformation of the transparent shaft.

Figure 9:
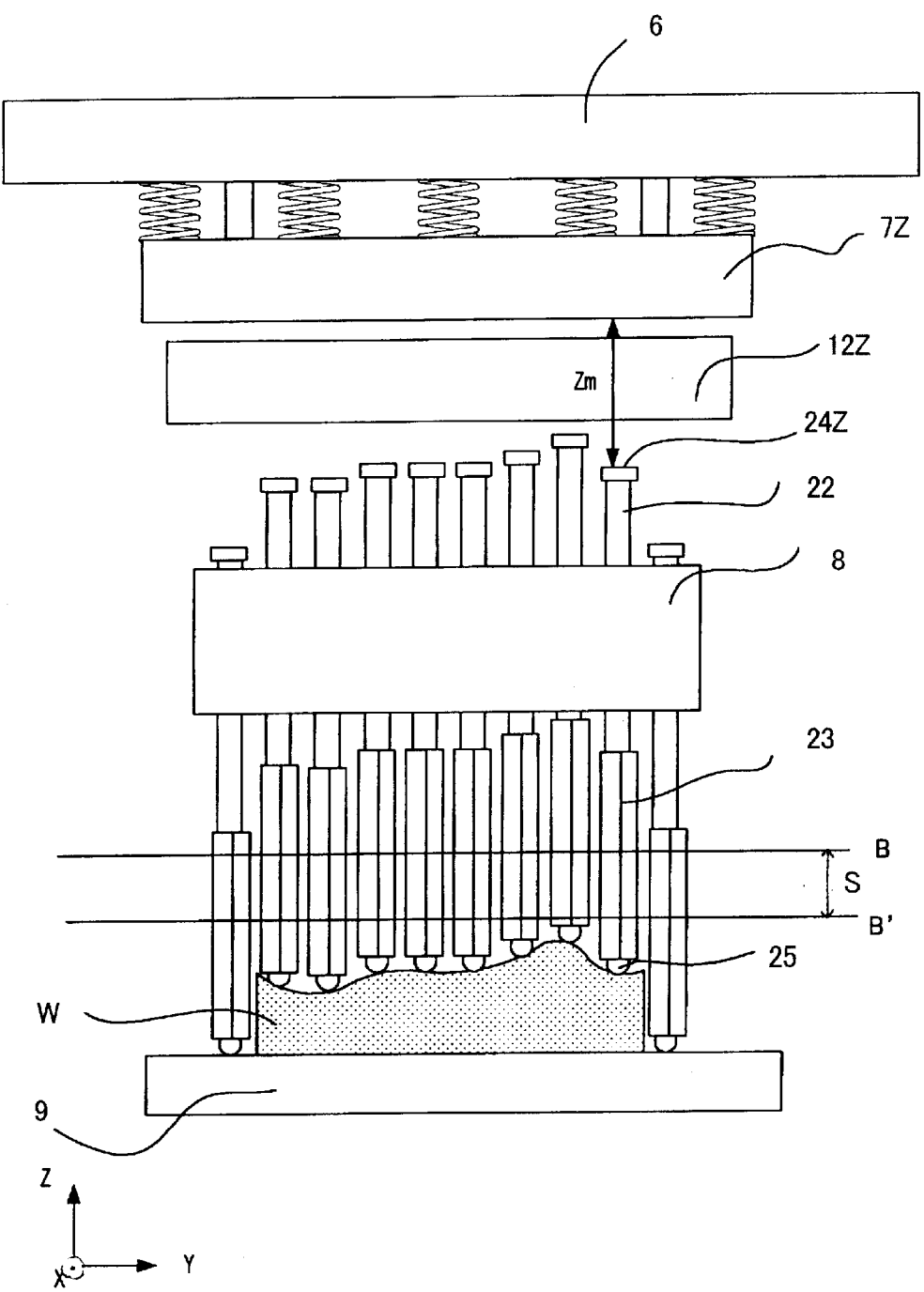
FIG. 9 is a view for explaining a measuring apparatus of a fourth embodiment.

FIG. 4 shows a fourth embodiment of the present invention, which provides, compared with the first embodiment, the X and Y measuring heads 12x and 12y with a plurality of positions of the X and Y reference plane mirrors 7x and 7y in the mirror block 23 in the X and Y directions. The X and Y measuring heads 12x and 12y measure positions of the mirror block 23 in the X and Y directions using a line B shown in FIG. 9 and a line B' apart from the line B by a proper span S in the Z-axis direction. A measurement method may arrange the X and Y measuring heads 12x and 12y two by two, or move, by the span S, the X and Y measuring heads 12x and 12y for measurement purposes, which have been arranged one by one in the Z-axis direction. A properly configured laser optical system of one-by-one arranged X and Y measuring heads 12x and 12y might measure two parallel lines at the same time. Measurements at two positions along the lines B and B' might measure rotary amounts around the X-axis and Y-axis, i.e., axis's inclination, and a correction of this inclined amount would measure a position of the contact ball 25 more precisely, improving the measurement precision.

The probe structures shown in FIGS. 2 and 8 may clearly employ, in addition to the miniature cylinder 27 for balancing the own weight, various approaches, such as a spring, buoyancy, electromagnetic force, gravity, etc., and the weight balance mechanism itself may be sometimes unnecessary where probe's own weight is sufficiently light, the object W is high rigid, and a forced deformation amount is negligible relative to the measurement precision. The miniature cylinder 27 is arranged in parallel to the probe shafts 22, but may be arranged coaxially.

Although the structure examples shown in FIGS. 1 and 7 may use the stage apparatus to move the multi-probe head 8 in the X and Z directions or X, Y and Z directions, but the measurement reference unit may have part or all of the function as a design matter.

As discussed, the inventive multi-probe shape measurement apparatus arranges a plurality of probes in tandem, and measures positions at which the plurality of probes contact the object to be measured, thereby obtaining one-dimensional shape data of the object. The inventive multi-probe shape measurement apparatus then moves the multi-probe unit in a direction orthogonal to the arrangement direction so that the multi-probe may simultaneously measure positions in the X-axis and Y-axis directions as well as the Z-axis direction, thereby improving the measurement precision for the object, and greatly reducing the measurement time.

Further, measurements at least two points of the probe in the Z-axis direction to calculate probe's inclination around the X-axis and Y-axis might correct probe's positions in the X-axis and Y-axis directions and measure object's position more accurately.

Further, the present invention is not limited to these preferred embodiments, and various modifications and changes may be made in the present invention without departing from the spirit and scope thereof.

What is claimed is:

1. A shape measuring apparatus which defines an XYZ-axis coordinate and measures a surface shape of an object, said apparatus comprising:

a plurality of probes arranged in a Y-axis direction, said probes contacting a surface of the object, and moving in a Z-axis direction according to the surface shape of the object;

a probe holder for holding each of the plurality of probes using guide that allows each of the plurality of probes to be movable in the Z-axis direction, each probe is connected to a balance means for adjusting a contact force between each probe and the object by balancing each probe's own weight;

a moving mechanism for moving said probe holding mechanism in an X-axis direction relative to the object;

first and second measuring instruments for measuring positions of each probe respectively in the X-axis and Y-axis directions;

a third measuring instrument for measuring a position of each probe respectively in the Z-axis direction; and a computing unit for calculating the surface shape of the object based on measuring results from said first, second, and third measuring instruments.

2. A shape measuring apparatus according to claim 1, wherein said first and second measuring instruments additionally measure inclinations of each probe in rotating directions around the X-axis and Y-axis, so as to correct the surface shape of the object calculated by said computing unit.

3. A shape measuring apparatus according to claim 2, wherein said first and second measuring instruments measure the inclinations of each probe in the rotating directions around the X-axis and Y-axis by measuring a plurality of points of said probes in the Z-axis direction.

4. A shape measuring apparatus according to claim 3, wherein a plurality of first and second measuring instruments are respectively arranged in the Z-axis direction, and simultaneously measure the plurality of points in the Z-axis direction.

5. A shape measuring apparatus according to claim 1, wherein said moving mechanism moves said probe holder in the X-axis direction while allowing the probes to contact the surface of the object.

6. A shape measuring apparatus according to claim 1, wherein said moving mechanism moves said probe holder in the X-axis direction while the probe is being separated from the surface of the object after measurements by said first, second and third measuring instruments.

7. A shape measuring apparatus according to claim 1, further comprising a second moving mechanism for moving said probe holder in the Y-axis direction relative to the object.

8. A shape measuring apparatus according to claim 1, wherein each probe includes:

a first position-measuring plane mirror arranged and rotated by a first angle from the X-axis around the Z-axis; and a second position-measuring plane mirror arranged and rotated by a second angle from the Y-axis around the Z-axis, wherein said first measuring instrument includes a first reference plane mirror arranged and rotated by the first angle from the X-axis around the Z-axis, and measures a separation between said first position-measuring plane mirror and the first reference plane mirror, and wherein said second measuring instrument includes a second reference plane mirror arranged and rotated by the second angle from the X-axis around the Z-axis, and measures a separation between said second position-measuring plane mirror and the second reference plane mirror.

9. A shape measuring apparatus according to claim 8, wherein each of the first and second angles is about 45°.

10. A shape measuring apparatus according to claim 8, wherein each probe includes a third position-measuring plane mirror for measuring a position of the probe in the Z-axis, wherein said third measuring instrument includes a third reference plane mirror having a normal in the Z-axis direction, and measures a separation between said third position-measuring plane mirror and the third reference plane mirror.

11. A shape measuring apparatus according to claim 10, wherein said probe includes:

a position-measuring mirror block provided with the first and second position-measuring plane mirrors;

a contact ball that is attached to a tip of the position-measuring mirror block, and contacts the object; and a probe shaft provided at a rear end of said position-measuring mirror block, the third reference plane mirror being formed at a rear end surface of said position-measuring mirror block.

12. A shape measuring apparatus according to claim 11, wherein said probe shaft has a hollow part, through which said third measuring instrument measures the separation between said third position-measuring plane mirror and the third reference plane mirror.

13. A shape measuring method for measuring a surface shape of an object on an XYZ-axis coordinate, said method comprising the steps of:
   holding a plurality of probes in a Y-direction using a guide means that allows each of the plurality of probes to be movable in a Z-axis direction, each probe being connected to a balance means for adjusting a contact force between each probe and an object by balancing each probe's own weight;
   moving, in the Z-axis direction, the plurality of probes arranged in the Y-axis direction, while bringing each probe into contact with the object;
   measuring contact position between each probe and the object in X-axis and Y-axis directions using first and second measuring instruments;
   measuring a contact position of each probe in the Z-axis direction using a third measuring instrument;
   moving the plurality of probes in the X-axis direction relative to the object;
   repetitively measuring contact positions of each probe in the X-axis, Y-axis, and Z-axis directions using the first, second and third measuring instruments; and
   calculating the surface shape of the object based on contact positions in the X-axis, Y-axis, and Z-axis directions measured by the first, second and third measuring instruments.

14. A shape measuring method according to claim 13, wherein the first and second measuring instrument additionally measure inclinations of each probe in rotating directions around the X-axis and Y-axis, so as to correct the surface shape of the object to be calculated.

15. A shape measuring method according to claim 14, wherein the first and second measuring instruments measure the inclinations of the probe in the rotating directions around the X-axis and Y-axis by measuring a plurality of points of the probes in the Z-axis direction.

16. A shape measuring method according to claim 14, wherein each of the first and second angles is about 45°.

17. A shape measuring method according to claim 14, wherein the probe includes a third position-measuring plane mirror for measuring a position of the probe in the Z-axis,
   wherein the third measuring instrument includes a third reference plane mirror having a normal in the Z-axis direction, and measures a separation between the third position-measuring plane mirror and the third reference plane mirror.

18. A shape measuring method according to claim 17, wherein said probe includes:
   a position-measuring mirror block provided with the first and second position-measuring plane mirrors;
   a contact ball that is attached to a tip of the position-measuring mirror block, and contacts the object; and
   a probe shaft provided at a rear end of the position-measuring mirror block, the third reference plane mirror being formed at a rear end surface of the position-measuring mirror block.

19. A shape measuring method according to claim 13, wherein the plurality of probes move in the X-axis direction relative to the object while contacting the surface of the object.

20. A shape measuring method according to claim 13, wherein the plurality of probes move in the X-axis direction while separated from the surface of the object after measurements by the first, second and third measuring instruments.

21. A shape measuring method according to claim 13, wherein the plurality of probes in the Y-axis direction relative to the object.

22. A shape measuring method according to claim 13, wherein the probe includes:
   a first position-measuring plane mirror arranged and rotated by a first angle from the X-axis around the Z-axis; and
   a second position-measuring plane mirror arranged and rotated by a second angle from the Y-axis around the Z-axis,
   wherein the first measuring instrument includes a first reference plane mirror arranged and rotated by the first angle from the X-axis around the Z-axis, and measures a separation between the first position-measuring plane mirror and the first reference plane mirror, and
   wherein said second measuring instrument includes a second reference plane mirror arranged and rotated by the second angle from the X-axis around the Z-axis, and measures a separation between the second position-measuring plane mirror and the second reference plane mirror.

23. A shape measuring method for measuring a surface shape of an object on an XYZ-axis coordinate, said method comprising the steps of:
   holding a plurality of probes in a Y-direction using a guide means that allows each of the plurality of probes to be movable in a Z-axis direction, each probe being connected to a balance means for adjusting a contact force between each probe and an object by balancing each probe's own weight;
   moving, in the Z-axis direction, the plurality of probes arranged in the Y-axis direction, while bringing each probe into contact with the object;
   measuring contact positions between each probe and the object in X-axis and Y-axis directions using first and second measuring instruments;
   measuring the contact position in the Z-axis direction using a third measuring instrument;
   measuring one sectional shape of the object in the Y-axis direction from the contact positions of the plurality of probes measured by the first, second and third measuring instruments;
   moving the plurality of probes in the X-axis direction relative to the object;
   repetitively measuring a plurality of sectional shapes in the Y-axis directions using the first, second and third measuring instruments; and
   calculating the surface shape of the object using the plurality of sectional shapes in the Y-axis direction measured by the first, second and third measuring instruments.

24. A shape measuring method according to claim 23, wherein the first and second measuring instruments measure inclinations of the probe in a rotating direction around the X-axis and Y-axis, so as to correct the surface shape of the object to be calculated.

25. A shape measuring apparatus which defines an XYZ-axis coordinate and measures a surface shape of an object, said apparatus comprising:

a plurality of probes arranged in a Y-axis direction, said probes contacting a surface of the object, and moving in a Z-axis direction according to the surface shape of the object, a probe holder for holding each of the plurality of probes using a guide means that allows each of the plurality of probes to be movable in the Z-axis direction, each probe is connected to a balance means for adjusting a contact force between each probe and the object by balancing each probe's own weight;

a moving mechanism for moving said probe holding mechanism in an X-axis direction relative to the object;

first and second measuring instruments for measuring moving amounts of each probe respectively in the X-axis and Y-axis directions;

a third measuring instrument for measuring a position of each probe respectively in the Z-axis direction; and a computing unit for calculating the surface shape of the object based on measuring results from said first, second, and third measuring instruments.

26. A shape measuring method for measuring a surface shape of an object on an XYZ-axis coordinate, said method comprising the steps of:

holding a plurality of probes in a Y-direction using a guide means that allows each of the plurality of probes to be movable in a Z-axis direction, each probe being connected to a balance means for adjusting a contact force between each probe and an object by balancing each probe's own weight;

moving, in the Z-axis direction, the plurality of probes arranged in the Y-axis direction, while bringing each probe into contact with the object;

measuring reference positions of the plurality of probes at contact positions in X-axis and Y-axis directions using first and second measuring instruments;

measuring positions of the plurality of probes at the contact positions in the Z-axis direction using a third measuring instrument;

moving the plurality of probes in the X-axis direction relative to the object;

repetitively measuring moving amounts of the plurality of probes in the X-axis and Y-axis directions and positions of the plurality of probes in the Z-axis direction using the first, second and third measuring instruments; and calculating the surface shape of the object based on measurement results by the first, second and third measuring instruments.

27. A shape measuring method for measuring a surface shape of an object on an XYZ-axis coordinate, said method comprising the steps of:

holding a plurality of probes in a Y-direction using a guide means that allows each of the plurality of probes to be movable in a Z-axis direction, each probe being connected to a balance means for adjusting a contact force between each probe and an object by balancing each probe's own weight;

moving, in the Z-axis direction, the plurality of probes arranged in the Y-axis direction, while bringing each probe into contact with the object;

measuring reference positions of the plurality of probes at contact positions in X-axis and Y-axis directions using first and second measuring instruments;

measuring position of the plurality of probes at the contact positions in the Z-axis direction using a third measuring instrument;

measuring a reference sectional shape of the object in the Y-axis direction based on the positions of the plurality of probes measured by the first, second and third measuring instruments;

moving the plurality of probes in the X-axis direction relative to the object;

repetitively measuring a plurality of variable sectional shapes in the Y-axis directions using the first, second and third measuring instruments; and calculating the surface shape of the object using the plurality of variable sectional shapes in the Y-axis direction measured by the first, second and third measuring instruments.

* * * * *

UNITED STATES PATENT AND TRADEMARK OFFICE
CERTIFICATE OF CORRECTION

PATENT NO. : 6,701,633 B2
DATED : March 9, 2004
INVENTOR(S) : Masaru Ohtsuka

It is certified that error appears in the above-identified patent and that said Letters Patent is hereby corrected as shown below:

Title page,
Item [56], References Cited, U.S. PATENT DOCUMENTS, add:
-- 5,144,150 A         9/1992         Yoshizumi et al.   .......... 250/561 --.
FOREIGN PATENT DOCUMENTS, add therein:
-- 06-317412         11/1994         Japan
   03-255907         11/1991         Japan
   2001-074636      3/2001          Japan --.

Signed and Sealed this

Twentieth Day of September, 2005

JON W. DUDAS
*Director of the United States Patent and Trademark Office*